United States Patent
Tscherepanow et al.

(10) Patent No.: US 10,782,667 B2
(45) Date of Patent: Sep. 22, 2020

(54) REAL-TIME ENVIRONMENT AND PROGRAMMABLE LOGIC CONTROLLER

(71) Applicant: BECKHOFF AUTOMATION GMBH, Verl (DE)

(72) Inventors: Marko Tscherepanow, Verl (DE); Dirk Janssen, Verl (DE); Andre Folkers, Verl (DE)

(73) Assignee: Beckhoff Automation GmbH, Verl (DE)

( * ) Notice: Subject to any disclaimer, the term of this patent is extended or adjusted under 35 U.S.C. 154(b) by 110 days.

(21) Appl. No.: 16/146,757

(22) Filed: Sep. 28, 2018

(65) Prior Publication Data

US 2019/0033814 A1 Jan. 31, 2019

Related U.S. Application Data

(63) Continuation of application No. PCT/EP2017/059185, filed on Apr. 18, 2017.

(30) Foreign Application Priority Data

Apr. 22, 2016 (DE) .................. 10 2016 107 527

(51) Int. Cl.
*G05B 19/05* (2006.01)
*G06F 9/48* (2006.01)

(52) U.S. Cl.
CPC ......... *G05B 19/054* (2013.01); *G06F 9/4881* (2013.01); *G06F 9/4887* (2013.01); *G05B 2219/1134* (2013.01)

(58) Field of Classification Search
CPC ............... G05B 19/054; G06F 9/4881
(Continued)

(56) References Cited

U.S. PATENT DOCUMENTS 4,215,399 A * 7/1980 Pavicic ............... G05B 19/052
                                                          700/7
6,427,099 B1    7/2002 Heinemann
(Continued)

FOREIGN PATENT DOCUMENTS

DE    19648422 A1    6/1998
DE    10243856 A1    4/2004
(Continued)

OTHER PUBLICATIONS

Kim, Byung Kook. "Task scheduling with feedback latency for real-time control systems." Proceedings Fifth International Conference on Real-Time Computing Systems and Applications (Cat. No. 98EX236). IEEE, 1998. pp. 1-5 (Year: 1998).*

(Continued)

*Primary Examiner* — Satish Rampuria
(74) *Attorney, Agent, or Firm* — Dorsey & Whitney LLP

(57) ABSTRACT

In a real-time environment at least one task is executed with a pre-defined task run-time, wherein at least one auxiliary function with indeterminate function run-time is to be processed within the specified task run-time by means of a time monitoring function. The time monitoring function, which defines a termination time for the auxiliary function within the pre-defined task run-time, is started. Then the auxiliary function is executed, wherein the time monitoring function monitors the function run-time and a function abort is initiated if the pre-defined abort time point is exceeded. Finally, the time monitoring function is terminated.

17 Claims, 7 Drawing Sheets

(58) Field of Classification Search
USPC .................................................... 718/1–108
See application file for complete search history.

(56) References Cited

U.S. PATENT DOCUMENTS

| | | | |
|---|---|---|---|
| 7,003,681 B2* | 2/2006 | Wu ....................... | G05B 19/05 700/18 |
| 7,207,045 B2 | 4/2007 | Goiffon | |
| 9,152,454 B2 | 10/2015 | Holembowski et al. | |
| 2003/0078954 A1* | 4/2003 | Haughey ............... | G06F 9/4881 718/102 |
| 2014/0304709 A1* | 10/2014 | Chandhoke .......... | G06F 9/4825 718/102 |
| 2018/0267496 A1* | 9/2018 | Wang ................... | G05B 19/056 |

FOREIGN PATENT DOCUMENTS

| | | |
|---|---|---|
| DE | 102009055752 A1 | 5/2011 |
| EP | 1312990 A2 | 5/2003 |
| EP | 1585000 B1 | 9/2008 |
| EP | 2568346 B1 | 12/2015 |

OTHER PUBLICATIONS

Haban, Dieter, and Kang G. Shin. "Application of real-time monitoring to scheduling tasks with random execution times." IEEE Transactions on software engineering;16.12 (1990): pp. 1374-1389. (Year: 1990).*

Wei, Zhenchun, et al. "A task scheduling algorithm based on Q-learning and shared value function for WSNs."Computer Networks126 (2017): pp. 141-149. (Year: 2017).*

Peshek, Clifford J., and Michael T. Mellish. "Recent developments and future trends in PLC programming languages and programming tools for real-time control." [1993] Record of Conference Papers 35th IEEE Cement Industry Technical. IEEE, 1993. pp. 219-230 (Year: 1993).*

Wang, Lingyun, and Arquimedes Canedo. "Offloading industrial human-machine interaction tasks to mobile devices and the cloud." Proceedings of the 2014 IEEE Emerging Technology and Factory Automation (ETFA). IEEE, 2014.pp. 1-4 (Year: 2014).*

Soetens, Peter, and Herman Bruyninckx. "Realtime hybrid task-based control for robots and machine tools." Proceedings of the 2005 IEEE International Conference on Robotics and Automation. IEEE, 2005.pp. 259-264 (Year: 2005).*

Cognex Corp., "Connecitivity and Networking are Key", TechNOTE, 2012, 2 pages.

Demant, Christian et al., "Industrial Image Processing", 3rd Edition, 2011, 11 pages.

Jahne, Bernd, "Digital image processing and Image acquisition", Z. Edition, 2012, 7 pages.

Norm IEC, "61 131-3", Architectural models; Communication model, 2013, 2 pages.

Steger, Carsten et al., "Machine Vision Algorithms and Applications", Wiley-VCH, 2008, 3 pages.

Stemmer Imaging, "The manual of the image processing", 2016, 32 pages.

Wikipedia, "First In-First Out", https://en.wikipedia.org/w/index.php?title=First_In_-_First_Out&oldid=185137610, Dec. 19, 2015, 3 pages.

Wikipedia, "Machine Vision", "https://en. wikipedia.org/w /index.php?title=Machine_ vision&oldid=693224278", Dec. 1, 2015, 6 pages.

Wikipedia, "Programmable logic controller", https://en.wikipedia.org/w/index.php?title=Speicherprogrammierbare_Steuerung&oldid=184876285, Jan. 19, 2016, 13 pages.

Wikipedia, "Wrappers (software)", https://en.wikipedia.org/w/index.php?title=Wrapper_(Software)&oldid=183960630, Dec. 23, 2018, 2 pages.

* cited by examiner

REAL-TIME ENVIRONMENT AND PROGRAMMABLE LOGIC CONTROLLER

CROSS-REFERENCE TO RELATED APPLICATIONS

This application is a continuation of PCT Application No. PCT/EP2017/059185, filed Apr. 18, 2017, which claims priority of German Patent Application DE 10 2016 107 527.2, filed Apr. 22, 2016, entitled ECHTZEITUMGEBUNG UND SPEICHERPROGRAMMIERBARE STEUERUNG and of PCT Application PCT/EP2017/059185, filed Apr. 18, 2017, entitled ECHTZEITUMGEBUNG UND SPEICHERPROGRAMMIERBARE STEUERUNG, which are incorporated by reference herein, in their entirety and for all purposes.

FIELD

The invention relates to a real-time environment and a programmable logic controller.

BACKGROUND

The control of actuators and sensors of a production system is usually carried out with the aid of a programmable logic controller (PLC), which can exist both as an external device and a software PLC. The PLC controls the respective actuators and sensors via a suitable communication interface, such as a fieldbus.

The control of actuators and sensors is performed on the PLC in the form of so-called tasks. The tasks are often executed cyclically. For faster processing a PLC can also distribute the tasks across multiple cores of a processor or multiple processors. A central task of the PLC in the control of the actuators and sensors is the synchronization with the actual production process.

In order to implement real-time control, it must be ensured that the task to be executed is fully processed within a specified maximum time, for example, within the time available for one cycle. Furthermore, the cyclic execution of the task must be carried out without temporal fluctuations (jitter) and with a predictable response time (latency).

From EP 2 568 346 B1 it is known to terminate a task if the execution time of the task is longer than a specified maximum execution time. If the task was not executed due to a timeout, the input variables are output as output variables of the task.

In addition, DE 102 43 856 B4 also describes a controller with function blocks, wherein the function blocks can contain a real-time function. The real-time function is terminated if the required processing time exceeds a predefined reference time.

DE 10 2009 055 752 A1 further discloses a method in which a task can be interrupted in favor of another task.

U.S. Pat. No. 7,207,045 B2 discloses monitoring of the run-time of tasks using time windows that are assigned to the tasks.

In addition to the actuators and sensors, which are controlled using the PLC, there are typically a plurality of other systems present in a production plant, the functions of which need to be synchronized with the production process and its controller by the PLC.

Thus, for example, vision systems are an essential part of modern production facilities. They are used for object detection, surface inspection, surveying or identification. In vision systems, a plurality of image processing and image analysis operations must be performed, which should preferably be carried out synchronously with the production process.

A further auxiliary function to be synchronized with the production process is the condition monitoring, in which a regular or permanent detection and evaluation of the condition of the production system is carried out by measurement and analysis of machine parameters that reflect the current status of the production process. Machine learning is another area where synchronization of auxiliary functions with the production process is desirable. The same applies to numerical control, in which a program code is converted into operation or movement sequences for a machine.

Vision systems and the other auxiliary systems mentioned, namely condition monitoring, machine learning and numerical control, are usually provided in the form of independent software components, separate from the PLC. In vision systems separate image processing computers or smart cameras are normally used, which are connected to the PLC via a communication medium, for example via Ethernet, I/Os or a fieldbus, in order to transfer the results of the calculation to the PLC.

If the vision function is running on an image processing computer, the connected cameras transmit the images or image regions to the image processing computer, which then performs the problem-specific image analysis. The vision function can also be executed directly on the camera, however. The cameras can also have their own dedicated I/Os in order to communicate directly with the actuators and sensors of the production system after appropriate configuration. The actuators and sensors of the production system then have the facility to trigger the image capture by the cameras or to activate the lighting via hardware triggers.

When a software PLC is used, the same hardware can be used for the control and the image processing. When a smart camera is used, the software PLC can also run on the camera in addition to the vision function, but this usually further limits the processing capacity of the intelligent camera. This approach is therefore only feasible for simple control and vision tasks.

For the transmission of the calculation results of the image analysis from the vision component to the PLC a data transfer is usually carried out between a normal user environment, in which the software of the vision component runs, and the real-time environment of the PLC. But this means that time-consuming communication and synchronization steps may then be required in the data transmission. In addition, the calculations required for the image analysis are performed outside of the real-time environment of the PLC and are thus also asynchronous with the production process.

EP 1 312 990 A2 describes a data processing method with which image and audio data related to the motion sequence of a machine can be linked to the data of the motion and drive controller of the machine. For this purpose, the image and audio data are provided with a time stamp generated by the motion and drive controller. The image and audio data time-synchronized to the data of the motion and drive controller of the machine can then be further processed or displayed.

A major problem in the synchronization of auxiliary functions, such as those of the vision systems, with the production process consists in the fact that their run-time is heavily influenced by the input data. Possible reasons for this in the case of image analysis by the vision systems are, for example, the subsequent processing after the detection of relevant structures, the iterative application of an algorithm depending on a convergence criterion, alternative search strategies, or so-called regions of interest in the picture with variable size. The calculation results are then available at variable points in time. However, this contradicts the requirement on the PLC to ensure a cyclical execution of the task without temporal fluctuations (jitter) with a predictable response time (latency), which prevents a simple integration of the vision function into the real-time environment of the PLC.

The same applies to the other above-mentioned auxiliary functions. In the case of condition monitoring time series are often analyzed using iterative methods, the run-time of which is dependent on reaching a quality criterion. In machine learning also, the computation time required for the training and use of classifiers or function approximators, for example, depends significantly on the input data. In numerical control complex iterative optimization algorithms are used, the run-time of which varies.

SUMMARY

The invention provides an improved real-time environment and an improved programmable logic controller which enable auxiliary functions with indeterminate function run-time to be integrated into the real-time environment.

According to one aspect, a real-time environment in which at least one task is executed with a pre-defined task run-time, wherein at least one auxiliary function with indeterminate function run-time is to be processed within the specified task run-time by means of a time monitoring function, comprises starting a time monitoring function, which defines a termination time for the auxiliary function within the pre-defined task run-time, executing the auxiliary function, wherein the time monitoring function monitors the function run-time and a function abort is initiated if the pre-defined abort time point is exceeded, and terminating the time monitoring function.

According to another aspect, a real-time environment comprises at least one task which is executed with a pre-defined task run-time, wherein at least one auxiliary function with indeterminate function run-time is to be processed within the specified task run-time by means of a time monitoring function. The time monitoring function and the auxiliary function form a command structure, wherein the time monitoring function is started immediately before and is stopped immediately after the auxiliary function.

According to another aspect, a programmable logic controller, which is connected via a fieldbus to actuators and sensors of a production system, comprises a real-time environment, in which at least one task is executed with a pre-defined task run-time, the task being used for controlling the actuators and the sensors, wherein an execution of an auxiliary function with indeterminate function run-time is synchronized with the controller by a time monitoring function.

EMBODIMENTS

In the real-time environment at least one task is executed with a pre-defined task run-time, wherein at least one function is to be processed within the specified task run-time. The function is executed by launching a time monitoring function, which defines a termination time point for the function within the specified task run-time, and then executing the function. The time monitoring function monitors the function run-time, wherein the function is aborted if the pre-defined time point is exceeded. The time monitoring function is subsequently terminated.

By providing the time monitoring function the execution of the auxiliary function is designed in such a way that the function run-time can be controlled as a function of the processing time still available in the current cycle of the task. The auxiliary function can therefore be executed directly in the real-time environment of the PLC. Any data processing of the auxiliary function outside the real-time environment and the associated communication and synchronization steps can be omitted. In addition, a precisely timed coupling of the auxiliary function to the timing of the production process is obtained.

The real-time environment also provides an abort function, which is called in order to execute the abort function if the pre-defined time point is exceeded by the function run-time. In such an approach the auxiliary function to be processed within the pre-defined task run-time is terminated in a precisely timed manner after the abort time is exceeded.

Alternatively, the auxiliary function can comprise an abort condition, which aborts the execution of the auxiliary function and returns a processing result if the pre-defined time point is exceeded by the function run-time. Such an approach will ensure a controlled function abort. The results of the auxiliary function at the abort time can then continue to be used without restriction.

The time monitoring function can determine the pre-defined abort time at the time of calling as the sum of the current time plus a maximum allowed time interval. The abort time point can then be dynamically determined and flexibly adapted.

Moreover, on termination the time monitoring function can output a characteristic parameter which indicates the proportion of the function execution completed. Alternatively or additionally, the characteristic parameter can indicate the number of accumulated function elements. The characteristic parameter provides a measure of confidence in the corresponding calculation results for the auxiliary function. The characteristic parameter can also be used to carry out an adjustment to the auxiliary function.

The function can have a plurality of functional elements, wherein the characteristic parameter output on the termination of the time monitoring function indicates the accumulated proportion of the completed execution of the function elements. With this approach it is possible to combine function elements in order to jointly monitor their run-time. It is also easily possible to include, for example, loops which call function elements iteratively in the runtime monitoring. The accumulation then computes the characteristic parameters of the run-time monitoring of the individual functional elements into an overall result over the entire monitored time period.

Furthermore, on termination the time monitoring function can output a time value which indicates the time difference between the current time and the pre-defined abort time. This determined remaining time can be used, for example, to optimize the execution of the auxiliary function in the real-time environment. In addition, the use of a processing time interval in the length of the remaining time by other components of the real-time system is conceivable.

On terminating, the time monitoring function can also output an error code which reflects an error condition in the execution of the time monitoring function.

The time monitoring function can have at least one subordinate time monitoring function element, which defines an abort time for an assigned function within the pre-defined task run-time before the abort time of the time monitoring function. Using such nested time monitoring function elements, individual functional elements of the auxiliary function, i.e. program code sections such as loops, can be monitored separately in relation to their run-time.

The time monitoring function is managed using a stack. The stack provides a simple means of forming hierarchical levels of the individual time monitoring function elements by means of an appropriate positioning on the stack.

A programmable logic controller is connected to actuators and sensors of a production system via a fieldbus. The programmable logic controller comprises a real-time environment in the previously described form, the task of which is used for controlling actuators and sensors, wherein the execution of the function is synchronized with the controller by the time monitoring function.

The programmable logic controller can be connected to a functional unit for image acquisition to transmit the image data thereof into the real-time environment, wherein the function is a vision function for the processing and/or analysis of the image data.

BRIEF DESCRIPTION OF THE DRAWINGS

The invention will be discussed in more detail below on the basis of figures. Here, in a schematic illustration in each case.

DETAILED DESCRIPTION

Figure 1:
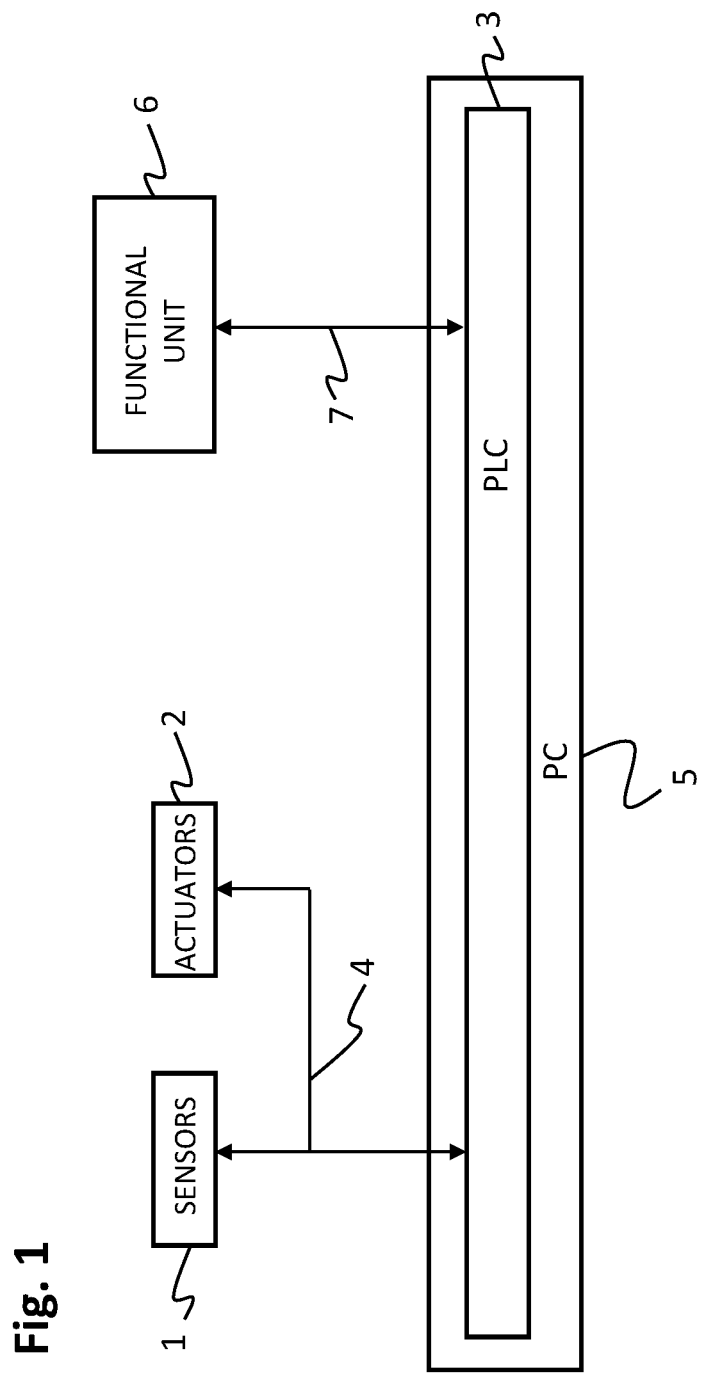
FIG. 1 shows a schematic diagram of a configuration of a programmable logic controller for a production system, which has actuators and sensors and an image acquisition unit.

In a production system a programmable logic controller (PLC) 3 is used to control sensors 1 and actuators 2, and, as FIG. 1 shows, is connected via a fieldbus 4 to the sensors 1 and actuators 2. The PLC can be embodied as a stand-alone data processing unit, for example in the form of an industrial PC 5, as shown in FIG. 1, or else run additionally on an existing unit of the production system as a software PLC. As an alternative to a fieldbus 4, a differently designed communication connection can be used for the data exchange between the sensors 1 and actuators 2 and the PLC 3.

The processing of the data from or for the sensors 1 and actuators 2 takes place on the PLC 3 in the form of units known as tasks. The tasks for controlling the sensors 1 and actuators 2 are generally executed cyclically, wherein it must be ensured that the tasks are guaranteed to be processed within a specified maximum time, for example within the time available for one cycle. Furthermore, the cyclic execution of the task must be guaranteed without temporal fluctuations (jitter) and with a predictable response time (latency). These requirements on the PLC 3 are implemented by a real-time environment.

In addition to the actuators 2 and sensors 1, production systems generally also comprise a plurality of additional systems, the functions of which must be synchronized with the production process and its controller by means of the sensors 1 and actuators 2 by the PLC 3. Vision systems represent such an auxiliary system. Vision systems can be used, for example, to carry out an object detection, a surface inspection, measurements or identification. In order to fulfil these tasks, the vision systems must execute a plurality of image processing and image analysis operations. Such image processing and image analysis operations can comprise, for example, filters, thresholds, morphological operators, geometric transformations, color space transformations, segmentation procedures, contour search and methods for texture and shape analysis.

The PLC 3, as shown in FIG. 1, has been extended to the effect that image data of a functional unit 6 for image acquisition, for example a camera of the vision system, directly access a memory space of the PLC 3. The functional unit 6 for image acquisition is also referred to hereafter as the image acquisition unit 6. In the example implementation shown in FIG. 1, which uses Ethernet 7 as a communication medium between the image acquisition unit 6 and the PLC 3, Ethernet packets from the image acquisition unit 6 are transmitted directly from a network adapter into the real-time environment of the PLC 3. In the real-time environment of the PLC 3 a protocol-specific processing of the Ethernet packets is performed to then process and analyze the image data in the real-time environment with the aid of vision functions. Instead of the use of Ethernet 7 for the image data transmission, other data bus systems can also be used.

In the vision functions the function run-times depend substantially on the volume of data present. Thus, the processing time for identifying relevant structures as part of a topological structure analysis, for example a contour search, can vary greatly. The iterative application of an algorithm depending on a convergence criterion, for example an iterative filter or a sub-pixel optimization, can lead to fluctuating function run-times. The same applies to the use of alternative search strategies, for example, that if a first partial algorithm is not successful a second partial algorithm is attempted. Also, a so-called region of interest with variable size leads to different function run-times. Consequently, the results of the respective function operations are available at varying times. However, this contradicts the requirement on the real-time environment of the PLC 3, which must guarantee the cyclic execution of the task without temporal fluctuations (jitter) and with a predictable response time (latency).

The integration of other auxiliary functions that must be synchronized with the production process and its controller by the PLC 3 into the real-time environment of the PLC 3 is also hindered by the unknown function run-time. Such an auxiliary function is that of condition monitoring, in which a regular or permanent detection and evaluation of the condition of the production system is carried out by measurement and analysis of machine parameters that reflect the current status of the production process. In the case of condition monitoring, iterative methods for the analysis of the acquired data are often used, in which the run-time is dependent on the attainment of a quality criterion and thus is not fixed in advance. Also in the area of machine learning and numerical control and other auxiliary functions to be synchronized with the production process, the function run-time varies.

To enable an auxiliary function with an indeterminate function run-time to be integrated into a real-time environment in which at least one task is executed with a pre-defined task run-time, a time monitoring function is provided, which defines an abort time for the function within the pre-defined task run-time. If a function is to be processed within the pre-defined task run-time, the time monitoring function is launched. The time monitoring function then monitors the function run-time, wherein the function is aborted if the pre-defined time point is exceeded.

By providing the time monitoring function the execution of the auxiliary function is designed in such a way that the function run-time can be controlled as a function of the processing time still available in the current cycle of the task. The auxiliary function can be executed directly in the real-time environment of the PLC 3 because with the aid of the time monitoring function the cyclic execution of the task can be guaranteed with a predictable response time. In addition, a precisely timed coupling of the algorithms executed by the auxiliary function to the timing of the production process is obtained.

In the following, it will be explained using the example of the vision function. The comments can also be applied to other auxiliary functions, however, in particular the above-mentioned additional auxiliary functions.

The time monitoring function, also referred to hereafter as a watchdog, can be configured as a wrapper function which wraps around the auxiliary function. The time monitoring function is thus executed as program code which surrounds the function software. The configuration of the time monitoring function as a wrapper offers the possibility of easily extending the software of the auxiliary function without the need for extensive intervention in the program code of the auxiliary function. The program code of the auxiliary function then runs inside the program code of the time monitoring function.

The watchdog can be implemented both pre-emptively and cooperatively. In a pre-emptive watchdog the auxiliary function to be processed within the pre-defined task run-time is terminated in a precisely timed manner after the abort time is exceeded. The watchdog in this case ensures continuous monitoring of the function run-time. If the pre-defined abort time is exceeded by the function run-time an abort function is invoked to execute the abort of the function. For this purpose, outside of the watchdog and the respective auxiliary function, an interrupt program can be configured, which is executed at the abort time. Alternatively, the abort function can also be part of the watchdog, into which the watchdog program code branches if the abort condition is satisfied by the specified abort time being exceeded.

The aborting of the execution of the auxiliary function can be effected, for example, via interrupts. In the pre-emptive watchdog, for example, a timer is started on startup, which on expiry triggers the interrupt which aborts the auxiliary function to be monitored. In the pre-emptive watchdog, the auxiliary function is generally aborted at an unknown program position within the auxiliary function, so that the auxiliary function can be in an undefined state, which means the results of the auxiliary function at the abort time are often of only limited use.

In contrast to the pre-emptive watchdog, the cooperative watchdog function allows a controlled function termination. For this purpose, the program code of the auxiliary function is preferably extended by inserting an additional condition, for example on function-specifically central processing loops. The auxiliary condition examines the processing time consumed for the algorithm of the auxiliary function at specified points in time, for example at the end of the associated processing loop. If the result of the examination is that the function run-time has exceeded the abort time, the associated processing loop of the auxiliary function is exited.

Already existing results of the auxiliary function can be used, since the auxiliary function is aborted in a controlled way by branching out at the end of a processing loop. The cancellation of the auxiliary function in the cooperative watchdog is usually less precisely timed compared to the pre-emptive watchdog however, because the cancellation only occurs at times specified by the auxiliary function.

The time monitoring function can determine the pre-defined abort time $t_{Abort}$ when called as the sum of the current time $t_{current}$ and a maximum permissible time interval $\Delta t_{max}$. The current time $t_{current}$ can be related to the beginning of the current task cycle:

$$t_{Abort} = t_{current} + \Delta t_{max} \qquad (1)$$

Watchdogs which determine their abort time dynamically according to equation (1) are also designated in the following as time-interval watchdogs.

Moreover, on termination the time monitoring function can output a characteristic parameter which indicates the proportion of the function execution completed. A numeric value from the time monitoring function, which reflects the proportion $a_f$ of the processing steps already executed in relation to the complete processing of an auxiliary function f, can be used as a characteristic parameter. The calculation of the characteristic parameter depends on the algorithm of the auxiliary function f.

Exemplary variants for the calculation of the proportion $a_f$ for a vision function as an auxiliary function are $$a_f = \frac{\text{current proportion of the processed } ROI}{\text{overall size of the processed } ROI} \qquad (2)$$

$$a_f = \frac{\text{desired accuracy}}{\max(\text{desired accuracy, current accuracy})} \qquad (3)$$

$$a_f = \frac{\text{number of executed partial algorithms}}{\text{number of possible partial algorithms}} \qquad (4)$$

Equation (2) is suitable for algorithms which process all pixels of a region of interest (ROI) sequentially, wherein the ROI may also include the entire image. The algorithms used can be, for example, simple convolution filters or threshold operators. Equation (2) is also—suitable for more complex algorithms such as labelling or contour search for calculating the proportion $a_f$.

The area of application of equation (3) is especially iterative algorithms, in which additional iterations continue to be performed until a desired accuracy is achieved. The accuracy in this case can be specified, for example, by the absolute magnitude of the change of one or more variables to be optimized between two successive iterations of the algorithm.

Equation (4) is suitable for complex algorithms which carry out alternative processing strategies depending on the results. For example, an algorithm for label recognition can first try to identify data matrix codes and if this fails, then carry out a further search for QR codes and then if necessary, for one-dimensional barcodes.

Combinations of the above equations are conceivable for determining the proportion $a_f$ for a vision function. The determined characteristic parameter, which specifies the proportion of the completed function execution when the function is aborted, is then available in addition to the calculation results of the auxiliary function. The characteristic parameter in this case represents a measure of confidence in the corresponding calculation results. On the basis of the respective proportion $a_f$ of the processing steps already completed in relation to the complete processing of the auxiliary function f, for example, less trustworthy calculation results can be excluded from further processing or be incorporated therein with a low weighting.

Alternatively, the characteristic parameter which represents the proportion of the completed function execution when the function is aborted can also be used to carry out an adjustment of the auxiliary function. A lower processing proportion $a_f$ in a vision function could be increased, for example, by adjusting the image acquisition parameters or the processing strategy in the next task cycle. The output of the characteristic parameter affords the programmer of the PLC the opportunity to detect problems in the execution of the auxiliary function even during a running task cycle, and by applying a subsequent modification to prevent crashes of vision functions and timeouts in the future.

The time monitoring function as a wrapper function can be called directly before the vision function and immediately thereafter. A possible command structure is:

err=StartWatchdog($t_{Abort}$)

VisionFunction( );

(n,a,$\Delta t_{Rest}$,err)=StopWatchDog( )

$t_{Abort}$ specifies the abort time relative to the current task cycle. err denotes an error code, the values of which are used to indicate error conditions in the execution of the time monitoring function. In a possible implementation err=0 can mean that no error has occurred during the execution of the time monitoring function, whereas err≠0 indicates an error.

The element n of the tuple (n, a, $\Delta t_{rest}$, err) specifies the number of the executed function elements of the auxiliary function. The meaning of the function elements will be explained later in connection with FIG. 2.

Furthermore, in the tuple (n, a, $\Delta t_{rest}$, err) in addition to the processing proportion a (in percent), the time difference $\Delta t_{Rest}$ from the current time $t_{current}$ to the abort time $t_{Abort}$ is also given by:

$$\Delta t_{Rest} = t_{Abort} - t_{current} \quad (5)$$

If an auxiliary function, in the example the vision function, is terminated prematurely then 0%≤$a_f$<100% and $\Delta t_{Rest}$<0. If an auxiliary function is completely executed, thus is terminated before reaching the abort time $t_{Abort}$, $a_f$=100% and $\Delta t_{Rest}$>0.

In addition to the characteristic parameter $a_f$, which specifies the proportion of the completed function execution when the function is aborted, the remaining time determined by the watchdog $\Delta t_{Rest}$ is also suitable for optimizing the execution of the auxiliary function in the real-time environment. The remaining time $\Delta t_{Rest}$ may be used, in particular, to evaluate the execution of the auxiliary function by software components outside of the current task. For example, a PLC program which is part of an additional task of the real-time environment can query the remaining time $\Delta t_{Rest}$ determined by the watchdog, in order to determine what proportion of the available computation time has actually been consumed by the execution of the auxiliary function. If unused computation time is available, then this computation time can be dynamically allocated for other, less time-critical tasks, such as the export of images from the vision function to a human-machine interface outside of the real-time environment.

By the implementation of the watchdog as a function element supplementary to the auxiliary function, for example in the form of a wrapper command structure, the watchdogs can be structured in a standardized way, which enables a simple modification and adjustment. The monitoring of the time behavior of a specific auxiliary function, for example the vision function, can thus be adjusted without changing the auxiliary function itself and/or its function parameters.

Figure 2:
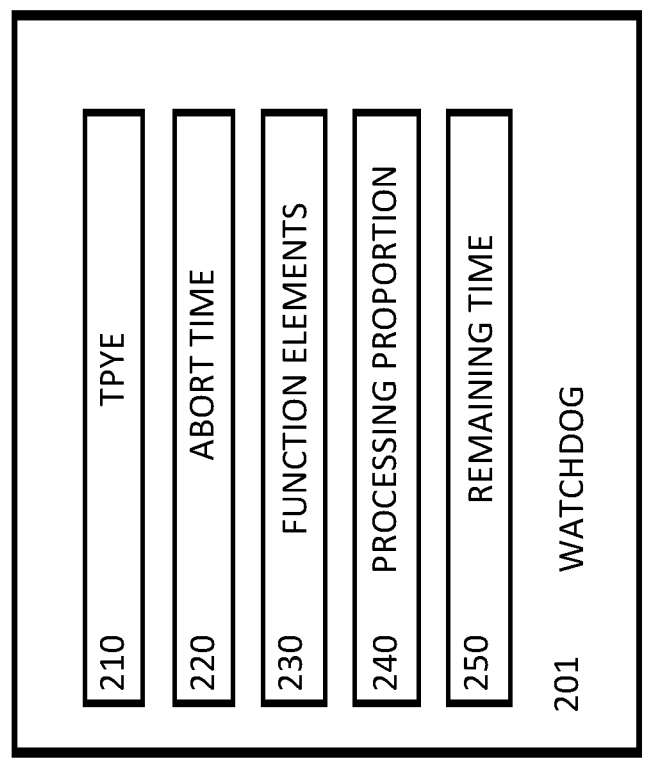
FIG. 2 shows a configuration of a data structure of a time monitoring function, which is executed in a real-time environment.

A possible data structure for a watchdog 201 is shown in FIG. 2. The watchdog data structure has a plurality of data fields, which contain watchdog parameters. A first data field 210 of these can indicate the watchdog type. The watchdog type can indicate, for example, whether a pre-emptive watchdog or a cooperative watchdog is being used. As another data field 220 the watchdog data structure contains the abort time $t_{Abort}$. In addition, a data field 230 is provided for the number of accumulated function elements n, a data field 240 for the accumulated processing proportion $\bar{a}$ and a data field 250 for the accumulated remaining time $\Delta \bar{t}_{Rest}$.

The watchdog data structure shown in FIG. 2 enables a monitoring of larger program code sections, including loops and branches, designated below as function elements, to be implemented in an auxiliary function. It is advantageous in this case to check at the beginning of the execution of each functional element of the auxiliary function whether the abort time $t_{Abort}$ has been exceeded. If this is the case, then the processing of further functional elements ceases. Functional elements that do not support partial processing are entered into the calculation with either processing proportion $a_f$=0% or $a_f$=100%.

If the results of the monitored auxiliary functional elements are largely independent of each other, the accumulated processing proportion $\bar{a}$ can be calculated approximately as an incremental mean value of the processing proportions of all the function elements called, wherein $a_f$ specifies the processing proportion of the current function element f and n the number of the previously called function elements:

$$\bar{a}(n+1) = \begin{cases} a_f, & \text{if } n = 0 \\ \dfrac{n \cdot \bar{a}(n) + a_f}{n+1}, & \text{otherwise} \end{cases} \quad (6)$$

If by contrast the calculation results of the function elements of the monitored auxiliary function are cumulative, then equation (6) for computing the calculated proportions delivers too optimistic values for the accumulated calculation proportion $\bar{a}$, because the current function element can only refer back to the successfully calculated proportion of results of the preceding functional elements. In this case a multiplicative computation is suitable, as specified in the following equation (7):

$$\bar{a}(n+1) = \begin{cases} a_f, & \text{if } n = 0 \\ \bar{a}(n) \cdot a_f, & \text{otherwise} \end{cases} \quad (7)$$

As an alternative to the equations (6) and (7), other calculation methods for the determination of the accumulated processing proportion $\bar{a}$ are also possible. Which type of calculation should be used in each particular case can be decided by the selection of an associated watchdog type. WatchdogTypeA, for example, can determine the accumulated processing proportion $\bar{a}$ with equation (6) and WatchdogTypeB with equation (7). The choice of the watchdog to be used can be made, for example, with the aid of the commands for starting and stopping. Thus the commands StartWatchdogTypeA and StopWatchdogTypeA can be used to start and stop a watchdog of type A and the commands StartWatchdogTypeB and StopWatchdogTypeB to start and stop a watchdog of type B.

Furthermore, the time monitoring function (watchdog) can have at least one subordinate time monitoring function element, also referred to hereafter as a child watchdog, which defines an abort time for an auxiliary function within the pre-defined task run-time before the abort time of the time monitoring function. By using such a nesting the watchdogs can form a hierarchy which enables a more accurate time monitoring of the auxiliary function.

In a nesting process, during the execution of a watchdog one or more child watchdogs can be called using the start and stop commands. The number of previously executed commands for starting watchdogs for which no corresponding command to stop the watchdog has yet occurred specifies the hierarchical level of the respective watchdog.

Figure 3:
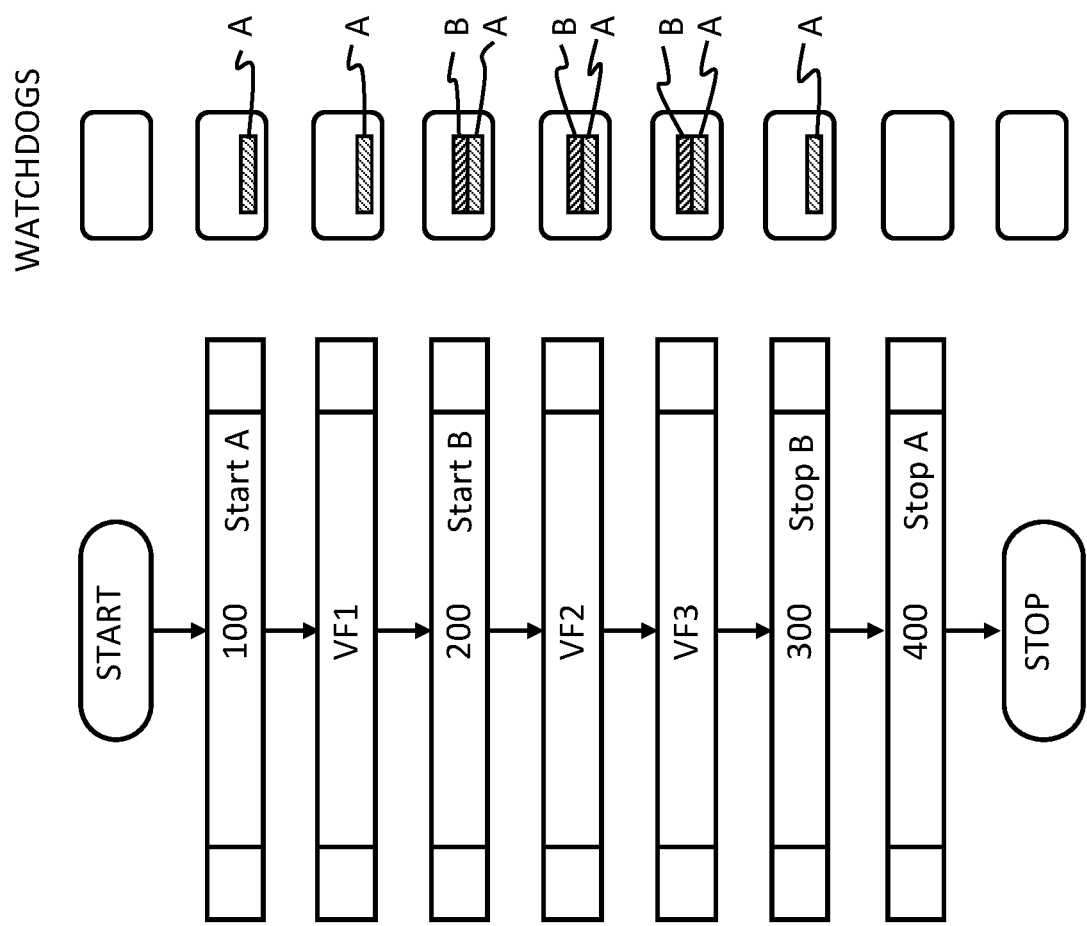
FIG. 3 shows a configuration of a stack with time monitoring functions.

A possible implementation can be, for example, a LIFO (last in, first out), also known as a stack, as is shown in FIG. 3.

In the example in FIG. 3 the stack has two watchdogs, wherein the parent watchdog is a watchdog of type A and the child watchdog is a watchdog of type B. The time behavior to be monitored is that of a vision function which has three function elements VisionFunction1 VF1, VisionFunction2 VF2 and VisionFunction3 VF3. On the left-hand side FIG. 3 shows the program sequence for monitoring the vision function with the two nested watchdogs, and on the right-hand side parallel to the individual program steps the currently active watchdogs in the stack.

After the program start, in program step 100 the parent watchdog of type A is started with the command StartWatchdogTypeA. The watchdog of type A is a time interval watchdog, which determines the abort time according to equation (1) from the current time $t_{current}$ and the maximum permissible time interval $\Delta t_{max}$, which is 5000 µs, for example. After starting the type A watchdog the vision function is called, and the vision function elements VisionFunction1 VF1, VisionFunction2 VF2 and VisionFunction3 VF3 are then executed consecutively.

Next, between the vision function elements VisionFunction1 VF1 and VisionFunction2 VF2 in program step 200 the child type B watchdog is started with the command StartWatchdogTypeB. The child type B watchdog is again configured as a time-interval watchdog, which when called determines the abort time from the sum of the current time $t_{current}$ and the maximum permissible time interval $\Delta t_{max}$, which is 4000 µs, for example. The child type B watchdog is used to monitor the function run-times of the vision function elements VisionFunction2 VF2 and VisionFunction3 VF3. Thereafter, in program step 300 the child type B watchdog is stopped with the command StopWatchdogTypeB. Then, in program step 400 the parent type A watchdog is also terminated with the command StopWatchdogTypeA.

In the watchdog stack also shown in FIG. 3, the respective active watchdogs for the individual program steps are shown. With the command StartWatchdogTypeA in program step 100 the parent type A watchdog is stored in the watchdog stack and remains active until the StopWatchdogTypeA command in program step 400. In program step 200 with the command StartWatchdogTypeB, the child type B watchdog is then placed onto the active parent type A watchdog in the watchdog stack. The child type B watchdog remains active above the parent type A watchdog until the command StopWatchdogTypeB in program step 300.

Using the watchdog stack and the nested watchdogs contained therein, individual functional elements of the auxiliary function, i.e. program code sections such as loops, can be monitored separately in relation to their run-time. In the program flowchart shown in FIG. 3 the child type B watchdog monitors the time behavior of the vision functional elements VisionFunction2 VF2 and VisionFunction3 VF3, while the parent type A watchdog monitors the time behavior of the entire vision function including the vision function element VisionFunction1 VF1 executed before the start of the child type B watchdog.

In the real-time environment, each task which supports watchdogs receives its own stack. The hierarchical level of the individual watchdog is represented by the position of the watchdog on the stack. For reasons of efficiency it is then possible to only ever use the topmost, and thus the hierarchically highest ranked, watchdog in the stack of the task for the time monitoring of an auxiliary function. In an alternative implementation however, the abort time of all watchdogs on the stack can also be checked.

In the nesting of watchdogs, the processing proportions of the individual watchdogs can be computed together. In a possible implementation the processing proportions of all watchdogs on the stack can be adjusted. In addition to a possible redundancy in calculations performed, with different computing rules for the accumulated processing proportion of the various watchdogs such as those given in equations (6) and (7) for example, such an implementation may lead to inconsistent results, however.

Alternatively the computation can also be configured in such a way that only the processing proportion of the topmost and thus the hierarchically highest ranked watchdog on the stack is adjusted. The accumulated processing proportion $\bar{a}$ and the number of accumulated function elements n of the auxiliary function are then propagated to the underlying and thus hierarchically lower ranked watchdog when the command to stop the watchdog is called. In this way, multiple and possibly different, computations of the processing proportion of individual functional elements of the auxiliary function are avoided.

The propagation of the accumulated processing proportions can be performed analogously to the computation of the processing proportions, as specified in equations (6) and (7). In the propagation of the accumulated processing proportions from a watchdog $W_1$ to a higher-level and thus hierarchically higher-ranked watchdog $W_2$, the accumulated processing proportion of $W_2$ is adjusted, for example as follows:

$$W_2 \cdot \bar{a} = \begin{cases} W_1 \cdot \bar{a}, & \text{if } W_2 \cdot n = 0 \\ \dfrac{W_2 \cdot n \cdot W_2 \cdot \bar{a} + W_1 \cdot n \cdot W_1 \cdot \bar{a}}{W_2 \cdot n + W_1 \cdot n}, & \text{otherwise} \end{cases} \quad (8)$$

or

-continued $$W_2 \cdot \bar{a} = \begin{cases} W_1 \cdot \bar{a}, & \text{if } W_2 \cdot n = 0 \\ W_2 \cdot \bar{a}(n) \cdot W_1 \cdot \bar{a}(n), & \text{otherwise} \end{cases} \quad (9)$$

The notation $W_X \cdot Y$ designates the data field Y of watchdog $W_X$. Equation (8) is equivalent to a computation similar to equation (6), and equation (9) to a computation analogous to equation (7).

In addition to the propagation of the processing proportions, the number of accumulated function elements n can also be propagated from the watchdog $W_1$ to the underlying and thus hierarchically lower-ranked watchdog $W_2$:

$$W_2 \cdot n = W_2 \cdot n + W_1 \cdot n \quad (10)$$

In addition to the monitoring of the time behavior of auxiliary functions, the watchdogs are also suitable for the optimization of the PLC, as explained above. This applies in particular to the accumulated remaining time $\Delta \bar{t}_{Rest}$ additionally determined by the watchdog, which in the watchdog data structure shown in FIG. 2 is stored in a data field and can be queried externally.

The accumulated remaining time $\Delta \bar{t}_{Rest}$ can contain the collected unused computation time of the watchdogs of the various hierarchical levels in a stack. When the command to stop the watchdog $W_1$ is called, the remaining time $\Delta \bar{t}_{Rest}$, which is given by $W_1 \cdot \Delta \bar{t}_{Rest} = \Delta t_{Rest}$, can be propagated to the watchdog $W_2$ of the underlying hierarchical level. The propagation of the remaining time from the watchdog $W_1$ to the watchdog $W_2$ can be carried out as follows:

$$W_2 \cdot \Delta \bar{t}_{Rest} = W_1 \cdot \Delta \bar{t}_{Rest} \quad (11)$$

For time-interval watchdogs, which when called determine the abort time as the sum of the current time and a maximum permissible time interval, this type of calculation is not sufficient however, since a time saving in a previously executed watchdog is automatically entered into the calculation of the abort time points $t_{Abort}$ of the following time-interval watchdogs, as is apparent from the above equation (1). For time-interval watchdogs therefore, the remaining time of previous watchdogs must be explicitly collected. This can be done using the following rule for propagation from the time-interval watchdog $W_1$ to the watchdog $W_2$:

$$W_2 \cdot \Delta \bar{t}_{Rest} = W_2 \cdot \Delta \bar{t}_{Rest} + W_1 \cdot \Delta \bar{t}_{Rest} \quad (12)$$

The sum of the accumulated remaining time $\Delta \bar{t}_{Rest}$ of all watchdogs on the stack in both variants represents the unused computing time and can then be read out from the watchdog data structure and further processed by software components of other tasks in order to optimize the behavior of the real-time environment of the PLC.

Figure 4:
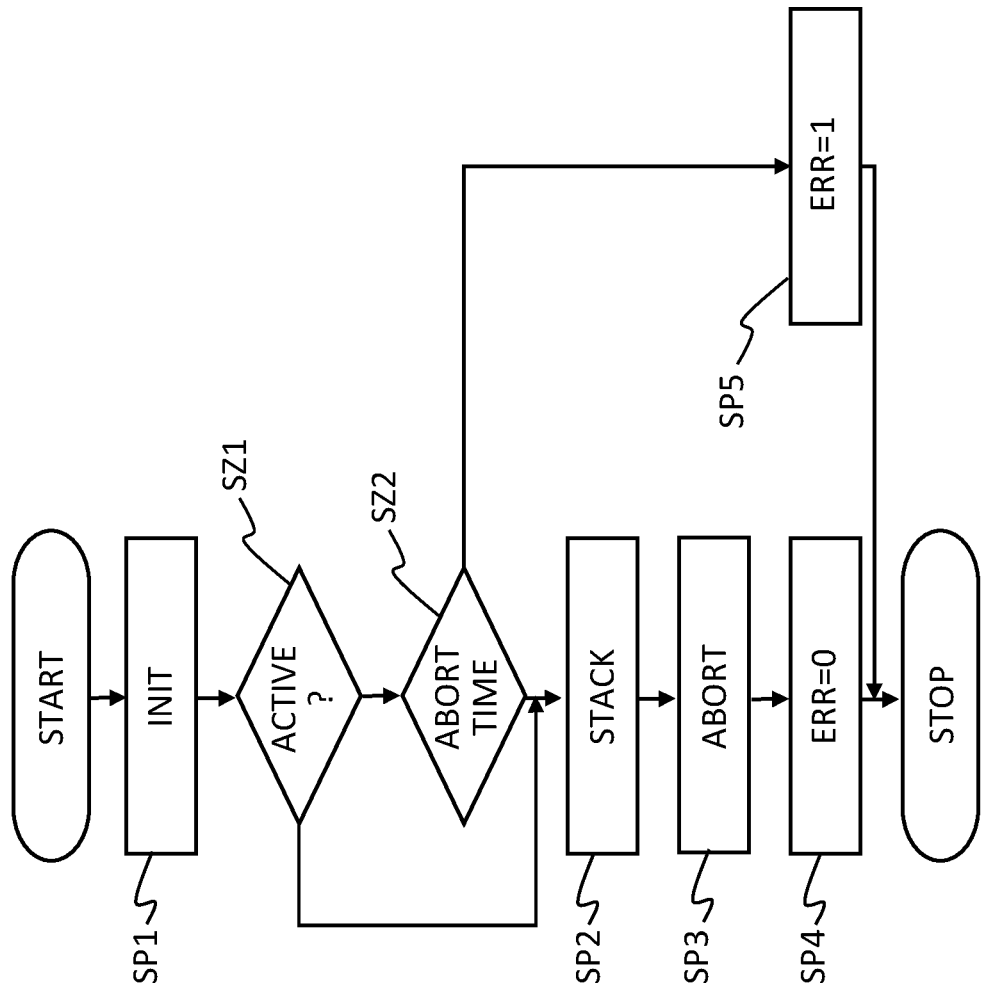
FIG. 4 shows a possible program flowchart for launching a time monitoring function, which is executed in a real-time environment.
Figure 5:
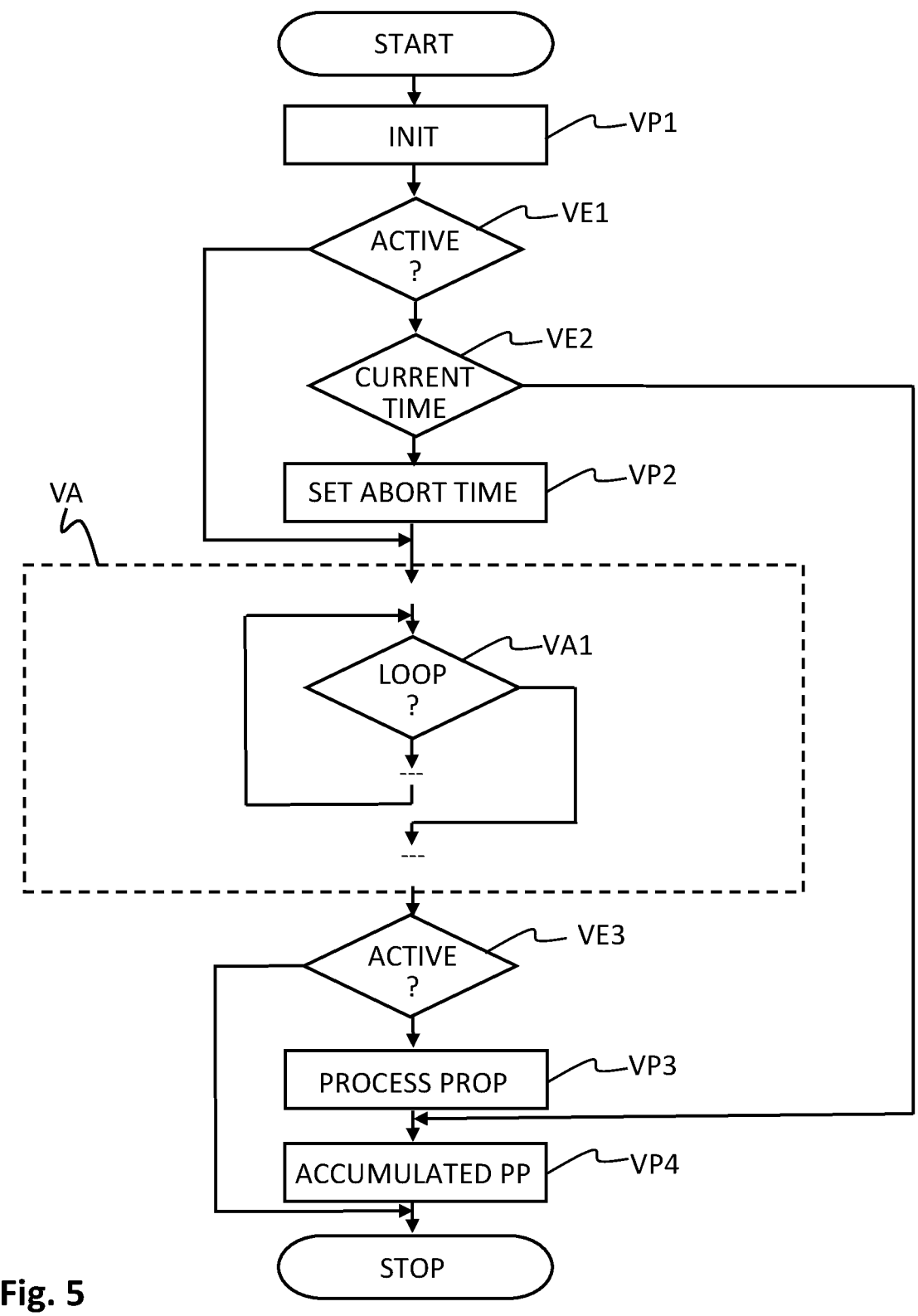
FIG. 5 shows a possible program flowchart for executing a vision function, which is executed in a real-time environment.
Figure 6:
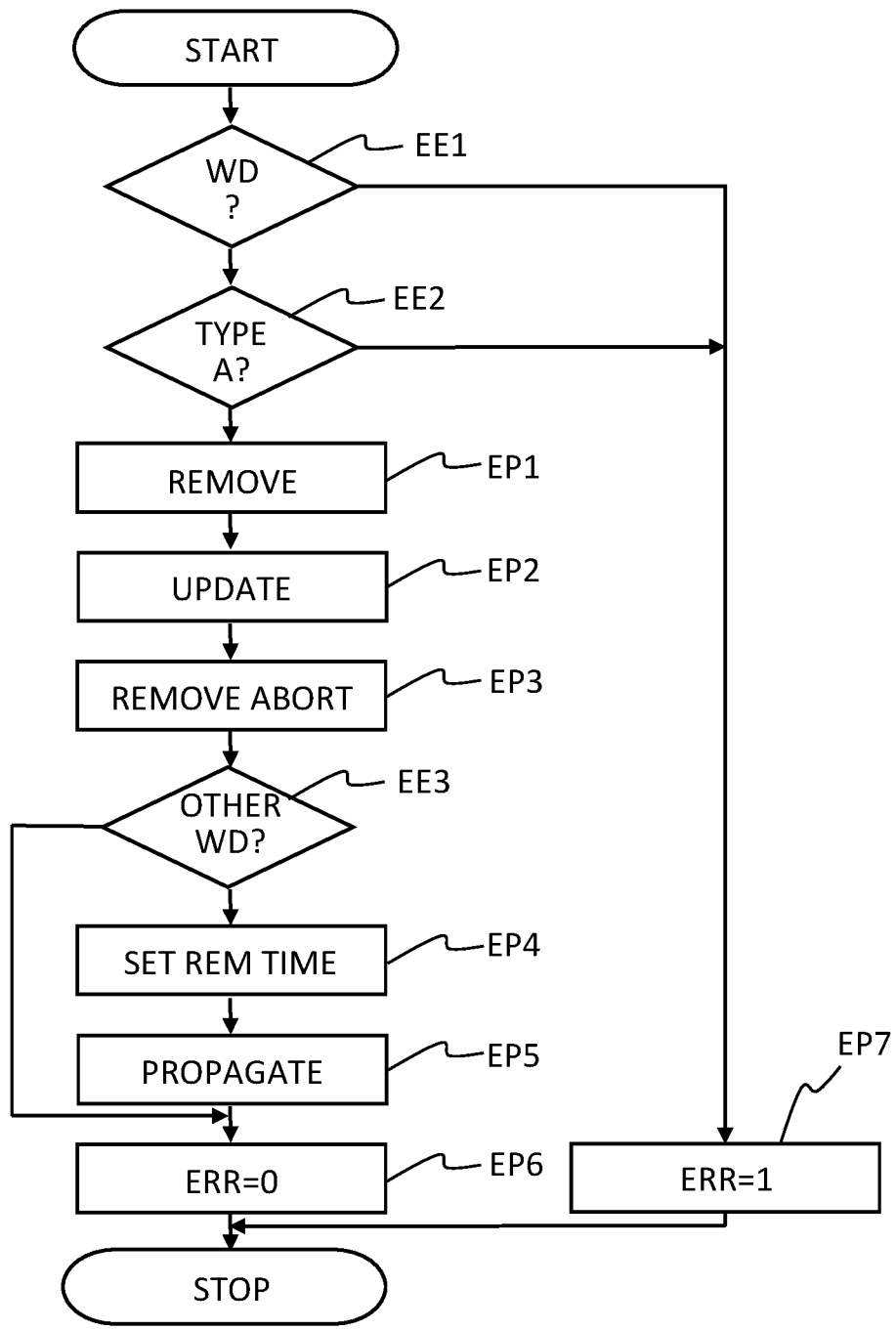
FIG. 6 shows a possible program flowchart for launching a time monitoring function, which is executed in a real-time environment.

FIGS. 4 to 6 show a possible program flowchart of a time monitoring function with a watchdog stack which is executed as a wrapper function for a vision function and which uses the command structure already explained with the commands err=StartWatchdog($t_{Abort}$); VisionFunction ( ); (n, a, $\Delta t_{Rest}$, err)=StopWatchdog( ). In the program flowchart an oval represents a control point such as Start and Stop, a rectangle indicates a program step and a diamond is a branching step, in which a decision must be made. In addition, arrows indicate the connections between the program and branching steps. Furthermore, in FIGS. 4 to 6 |S| stands for the number of watchdogs on the watchdog stack and $W_S$ for the topmost watchdog on the watchdog stack.

FIG. 4 shows an example program flowchart for the command err=StartWatchdogTypeA ($t_{Abort}$), wherein a watchdog W of watchdog type A is to be started as part of a watchdog stack.

In a first program step SP1 the watchdog W initializes its data structure shown in FIG. 2. In doing so the watchdog W, which is a time-interval watchdog, determines the abort time $t_{Abort}$ from the current time $t_{current}$ and the maximum permissible time interval $\Delta t_{max}$. In addition, the data fields number of accumulated function elements n, accumulated processing proportion $\bar{a}$ and accumulated remaining time $\Delta \bar{t}_{Rest}$ are set to 0.

In a first decision step SZ1 it is then determined whether watchdogs are already active in the watchdog stack.

If the result of the query is that there is already a watchdog active, hence |S|>0, in a second decision step SZ2 it is checked whether the abort time of the watchdog W is less than or equal to the abort time of the topmost watchdog $W_S$ in the watchdog stack.

If this is true, in a second program step SP2 the watchdog W places itself on top of the watchdog stack.

Optionally, if it is a pre-emptive watchdog, the watchdog W then prepares an abort function in a third program step SP3.

Then, in a fourth program step SP4, an error code err=0 is set, to indicate that no error has occurred during the program execution.

If in the first decision step SZ1 it is determined that no watchdog is active in the watchdog stack, hence |S|=0, the program branches, bypasses a second decision step SZ2 and continues directly to the second program step SP2.

If in a second decision step SZ2 it is determined that the abort time of the watchdog W is greater than the abort time of the topmost watchdog $W_S$ in the watchdog stack, in other words the abort time of the topmost watchdog $W_S$ in the watchdog stack is located before the abort time of the watchdog W to be started, processing branches out of the program and in a fifth program step SP5 an error code err=1 is set to indicate that an error has occurred in the watchdog startup.

After the fourth program step SP4, in which the error code err=0 is set, or the fifth program step SP5 in which the error code err=1 is set, the program processing of the command err=StartWatchdog($t_{Abort}$) is terminated.

FIG. 5 shows an example of the program sequence of the command VisionFunction ( ) for the execution and time monitoring of the vision function element VisionFunction, which is called after the command err=StartWatchdog ($t_{Abort}$), the program sequence of which is shown in FIG. 4.

In the program sequence of the VisionFunction ( ) command, in a first program step VP1 an initialization is performed in which the processing proportion of is set to 0 and the abort time $t_{Abort}$ is set to infinite.

In a subsequent first decision step VE1 it is then checked whether an active watchdog is already present in the watchdog stack.

If the result of the query determines that a watchdog is active, hence |S|>0, in a second decision step VE2 it is checked whether the current time $t_{current}$ is earlier in time than the abort time $t_{Abort}$ of the topmost active watchdog $W_S$ in the watchdog stack.

If this is true, in a second program step VP2 the abort time $t_{Abort}$ is set to the abort time $t_{Abort}$ of the topmost active watchdog $W_S$.

The vision algorithm VA of the vision function element VisionFunction is then subsequently executed. As part of this, at the end of each loop of the vision algorithm the respective loop condition is examined in the decision-making step VA1. At the same time, the current time $t_{current}$ is continuously compared with the abort time $t_{Abort}$. The vision algorithm is performed until a loop condition is satisfied or the current time is equal to the abort time.

If the active watchdog is a pre-emptive watchdog, an abort function is called to abort the vision algorithm VA if the run-time of the vision algorithm VA exceeds the abort time. In the case of a cooperative watchdog as the active watchdog, the program code of the vision algorithm VA is extended to include an additional condition. In the decision step VA1 the additional condition compares the current time $t_{current}$ with the abort time $t_{Abort}$ at the end of each processing loop. If as a result of the comparison it is found that the abort time has been exceeded, the processing loop is exited and the vision algorithm VA is thus terminated in a controlled manner.

If the execution of the vision algorithm VA of the vision function element VisionFunction is terminated, in a third decision step VE3 it is checked again whether an active watchdog is located in the watchdog stack.

If this is the case, in a third program step VP3 the processing proportion $a_f$ of the vision function element VisionFunction is determined. The calculation rule is defined by the vision algorithm VA, wherein for example, the equations (2), (3) or (4) can be used.

The processing proportion $a_f$ is then computed in a fourth program step VP4 with the processing proportions accumulated in the watchdog stack, so that the processing proportion can be determined for the entire vision function, wherein, for example, the equations (8) or (9) can be used. The processing of the VisionFunction ( ) command is then terminated.

If in the first decision step VE1 it is determined that there is no watchdog active, hence |S|=0, processing is transferred directly to the execution of the vision algorithm VA of the vision function element VisionFunction. Since no time monitoring with a watchdog is then executed, the originally initialized abort time remains infinite, and only the loop condition is checked during the execution.

If in the second decision step VE2 it is determined that the current time $t_{current}$ is chrono-logically later than the abort time $t_{Abort}$ of the topmost active watchdog $W_S$ in the watchdog stack, the vision algorithm VA of the vision function element VisionFunction is not executed and the program processing is continued with the fourth program step VP4. The initialized processing proportion $a_f=0$ is then computed with the processing proportions accumulated in the watchdog stack and the program processing of the VisionFunction ( ) command is then terminated.

If in the third decision step VE3 it is determined that no other active watchdog is contained in the watchdog stack, the program branches and the program processing of the VisionFunction ( ) command is terminated immediately.

FIG. 6 shows an example of the program sequence for the command (n, a, $\Delta t_{Rest}$, err)=StopWatchDogTypeA( ) with which the Watchdog W is terminated again by the type A watchdog. The command (n, a, $\Delta t_{Rest}$, err)=StopWatchDog-TypeA( ) is called after the VisionFunction ( ) command, the program flowchart of which is shown in FIG. 5.

In a first decision step EE1 it is checked whether a watchdog to be terminated is present in the watchdog stack.

If it is determined from the query that a watchdog is active in the watchdog stack, in a second decision step EE2 it is tested whether it is a watchdog of type A.

If it is determined that the active watchdog $W_S$ in the watchdog stack is such a watchdog of type A, the watchdog is removed from the stack in a first program step EP1.

In a second program step EP2 the data structure of the watchdog W removed from the stack is then updated. In the process, the processing proportion a is set to the value that was determined in the fourth program step VP4 of the program sequence of the VisionFunction ( ) command, as was described with reference to FIG. 5. The remaining time $\Delta t_{Rest}$ is determined with equation (5), which determines the time difference from the current time $t_{current}$ to the abort time $t_{Abort}$.

If the watchdog W is a pre-emptive watchdog, in a third program step EP3 the abort function is then also removed.

In a third decision step EE3 it is then checked whether other watchdogs are present in the watchdog stack after removal of the watchdog W.

If in the third decision step EE3 it is determined that other watchdogs are active in the watchdog stack, hence |S|>0 is true, then in a fourth program step EP4 the accumulated remaining time $\Delta \bar{t}_{Rest}$ for the watchdog W is set to the remaining time $\Delta t_{Rest}$ calculated in the second program step EP2.

In a fifth program step EP5, the number of accumulated function elements W·n, the accumulated processing proportion W·ā and the accumulated remaining time W·$\Delta \bar{t}_{Rest}$ are then propagated from the watchdog W to the topmost active watchdog $W_S$ in the watchdog stack.

Then, in a sixth program step EP6, an error code err=0 is set, to indicate that no error has occurred during the program execution.

If in the first decision step EE1 it is determined that there is no active watchdog in the watchdog stack, hence |S|=0, then the program branches and in a seventh program step EP7 sets an error code err=1 to indicate that an error has occurred in the watchdog-stop.

If in the second decision step EE2 it is determined that the active watchdog $W_S$ at the top of the watchdog stack is not a watchdog of type A, the program processing is also continued with the seventh program step EP7, which sets the error code err to 1 to indicate an execution error.

If it is determined in the third decision step EE3 that there is no longer an active watchdog in the watchdog stack, hence |S|=0, the 6th program step EP6 is then executed and an error code err=0 is set.

After the sixth program step EP6 which sets the error code err=0, or the seventh program step EP7 in which the error code err=1 is specified, the program processing of the command (a, $\Delta t_{Rest}$, err)=StopWatchdogTypeA( ) is terminated.

Figure 7:
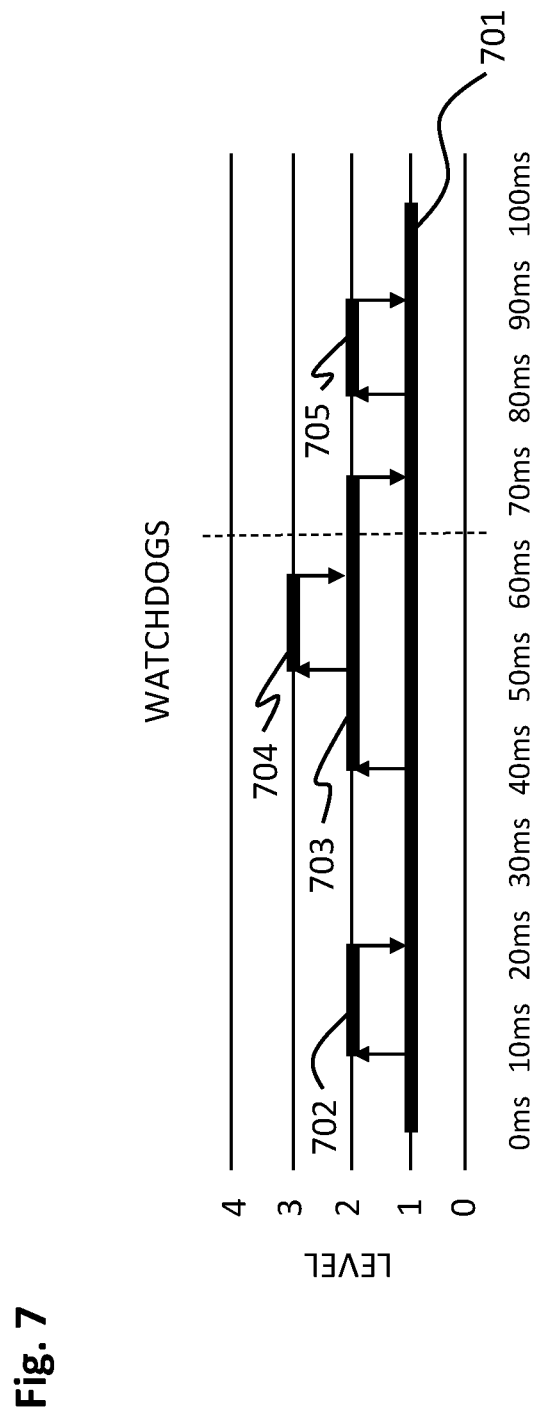
FIG. 7 shows an example of the propagation of the remaining time when executing a plurality of nested time monitoring functions.

FIG. 7 shows an example of the propagation of the remaining time in a watchdog stack with five watchdogs 701 to 705, which are distributed over three hierarchical levels 1, 2, 3, wherein on each hierarchical level no more than one watchdog is active at any given time. In the illustration in FIG. 7 the three hierarchical levels 1, 2, 3 are plotted on the Y-axis. The hierarchically lowest hierarchical level 1 contains the watchdog 701. In the next higher hierarchical level 2 the watchdog 702, the watchdog 703 and the watchdog 705 are arranged. The topmost hierarchical level 3 contains the watchdog 704.

The x-axis in FIG. 7 shows the chronological sequence of the five watchdogs 701 to 705 in the watchdog stack. The numbering of the watchdogs corresponds to the start time of each watchdog. The arrow from the lower hierarchical level to the next higher hierarchical level shows the program call of the watchdog in each case. The arrow from the higher hierarchical level to the next lower hierarchical level shows the termination of the watchdog.

The watchdog 701 located in the hierarchical level 1 starts at time 0 ms and terminates its execution at time 100 ms. The watchdog 702 located in the hierarchical level 2 starts at time 10 ms and terminates its execution at time 20 ms. The watchdog 703 located in the hierarchical level 2 starts at time 40 ms and terminates its execution at time 70 ms. The watchdog 705 located in the hierarchical level 2 starts at time 80 ms and terminates its execution at time 90 ms. The watchdog 704 located in the hierarchical level 3 starts at time 50 ms and terminates its execution at time 60 ms.

The five watchdogs 701 to 705 are each time-interval watchdogs, wherein in FIG. 7 the actual run-time of the watchdog, which is obtained from the specified start and stop times and which is determined by the function run-time of the associated function elements to be monitored. The watchdog 702 has an abort period of 15 ms, the watchdog 703 has an abort period of 11 ms, the watchdog 704 has an abort period of 37 ms and the watchdog 705 has an abort period of 18 ms. Therefore, this leaves remaining times for the watchdog 702 of 5 ms, for the watchdog 703 of 7 ms, for the watchdog 704 of 1 ms and for the watchdog 705 of 8 ms.

If a propagation of the remaining time is to be carried out, for example, at the time of 65 ms, which appears as a dashed line in FIG. 7, this results in a time saving of 1 ms on the hierarchical level 3 due to the watchdog 704 and on the hierarchical level 2 directly below in a time saving of 5 ms by the watchdog 702, so that if the remaining time is propagated at the time of 65 ms the accumulated remaining time is 6 ms.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A method of operating a real-time environment comprising:
executing at least one task on a programmable logic controller (PLC) with a pre-defined task run-time, the task comprising processing data of a system including sensors and actuators controlled by the programmable logic controller, wherein at least one auxiliary function controlled by the programmable logic controller (PLC) with indeterminate function run-time is to be processed within the pre-defined task run-time by a time monitoring function, the auxiliary function comprising processing data of an auxiliary system, wherein the auxiliary function and the time monitoring function form a program code executed within the real-time environment;
starting the time monitoring function, which defines a termination time for the auxiliary function within the pre-defined task run-time, the termination time having a pre-defined abort time point;
executing the auxiliary function, wherein the time monitoring function monitors a run-time of the auxiliary function and a function abort is initiated if the pre-defined abort time point is exceeded; and
terminating the time monitoring function.

2. The method as claimed in claim 1, wherein the time monitoring function is configured as a wrapper function which surrounds the program code of the auxiliary function, so that the program code of the auxiliary function is executed within the program code of the time monitoring function.

3. The method as claimed in claim 1, wherein an abort function is provided, which is called in order to execute the abort function if the pre-defined time point is exceeded by the function run-time.

4. The method as claimed in claim 1, wherein the auxiliary function comprises an abort condition, which aborts the execution of the auxiliary function and returns a processing result if the pre-defined time point is exceeded by the function run-time.

5. The method as claimed in claim 1, wherein the time monitoring function defines the pre-defined abort time point at the time of calling as the sum of the current time and a maximum allowed time interval.

6. The method as claimed in claim 1, wherein on termination the time monitoring function outputs a characteristic parameter which indicates the proportion of the function execution completed.

7. The method as claimed in claim 6, wherein the auxiliary function has a plurality of function elements and wherein the characteristic variable which is output when terminating the time monitoring function indicates the accumulated proportion of the completed execution of the function elements and/or the number of accumulated function elements.

8. The method as claimed in claim 1, wherein on terminating the time monitoring function outputs a time value which indicates the time difference between the current time and the pre-defined abort time.

9. The method as claimed claim 1, wherein on termination the time monitoring function outputs an error code which indicates an error condition in the execution of the time monitoring function.

10. The method as claimed in claim 1, wherein the time monitoring function has at least one subordinate time monitoring function element, which defines an abort time for an assigned auxiliary function within the pre-defined task run-time before the abort time of the time monitoring function.

11. The method as claimed in claim 10, wherein the time monitoring function is managed using a stack.

12. A real-time environment management system comprising:
at least one task which is executed on a programmable logic control (PLC) with a pre-defined task run-time, the task comprising processing data of a system including sensors and actuators controlled by the programmable logic controller (PLC), and
at least one auxiliary function with indeterminate function run-time which is to be processed within the specified task run-time by a time monitoring function, the at least one auxiliary function comprising processing data of an auxiliary system,
wherein the time monitoring function and the auxiliary function form a command structure,
wherein the time monitoring function is started immediately before and is stopped immediately after the auxiliary function within the command structure, and
wherein the time monitoring function defines the pre-defined abort time point at the time of calling as the sum of the current time and a maximum allowed time interval.

13. The real-time environment management system as claimed in claim 12, wherein the time monitoring function is configured as a wrapper function which surrounds the program code of the auxiliary function, so that the program code of the auxiliary function is executed within the program code of the time monitoring function.

14. The real-time environment management system as claimed in claim 12, wherein the auxiliary function comprises an abort condition, which aborts the execution of the auxiliary function and returns a processing result if the pre-defined time point is exceeded by the function run-time.

15. A programmable logic controller, which is connected via a fieldbus to actuators and sensors of a production system, wherein the programmable logic controller comprises:
- a real-time environment, in which at least one task is executed with a pre-defined task run-time, the task being used for controlling the actuators and the sensors, and
- at least one auxiliary function with indeterminate function run-time, the auxiliary function being used for processing data of an auxiliary system,
- wherein an execution of the auxiliary function with indeterminate function run-time is synchronized with the task by a time monitoring function, and
- wherein the time monitoring function has at least one subordinate time monitoring function element, which defines an abort time for an assigned auxiliary function within the pre-defined task run-time before the abort time of the time monitoring function.

16. The programmable logic controller as claimed in claim 15, which is connected to a functional unit for image acquisition, to transmit the image data thereof into the real-time environment, wherein the auxiliary function is a vision function for the processing and/or analysis of the image data.

17. The programmable logic controller as claimed in claim 15, wherein the time monitoring function is managed using a stack.

* * * * *